United States Patent [19]

Stephenson

[11] Patent Number: 5,613,169

[45] Date of Patent: Mar. 18, 1997

[54] COMPACT CAMERA WITH UNEXPOSED-FILM STORAGE SLOT SURROUNDING FLASH RECEIVING POCKET FOR FLIP-UP FLASH UNIT

[75] Inventor: Stanley W. Stephenson, Spencerport, N.Y.

[73] Assignee: Eastman Kodak Company, Rochester, N.Y.

[21] Appl. No.: 612,030

[22] Filed: Mar. 7, 1996

[51] Int. Cl.$^6$ .............................. G03B 15/03; G03B 17/04
[52] U.S. Cl. ............................................. 396/178
[58] Field of Search .................... 354/187, 288, 354/149.11, 216

[56] References Cited

U.S. PATENT DOCUMENTS

| | | |
|---|---|---|
| 316,647 | 4/1885 | Parsell et al. . |
| 385,513 | 7/1888 | Harkness . |
| 552,633 | 1/1896 | Esmond . |
| 579,949 | 4/1897 | Brownell . |
| 2,513,740 | 7/1950 | Perlin . |
| 2,521,743 | 9/1950 | Perlin . |
| 2,668,473 | 2/1954 | Brixner . |
| 4,202,614 | 5/1980 | Harvey ................................. 354/121 |
| 4,561,742 | 12/1985 | Stella et al. ............................. 354/86 |
| 5,005,032 | 4/1991 | Burnham ........................... 354/149.11 |
| 5,084,719 | 1/1992 | Hara et al. ............................. 354/75 |
| 5,264,884 | 11/1993 | Michaud .......................... 354/149.11 |
| 5,515,126 | 5/1996 | Baxter et al. ...................... 354/149.11 |

Primary Examiner—Safet Metjahic
Assistant Examiner—John Chizmar
Attorney, Agent, or Firm—Roger A. Fields

[57] ABSTRACT

A compact camera comprises a body portion, and a flash unit supported to be flipped up from the body portion for picture-taking and to be flipped down to the body portion for storage. The body portion is configured to form an exterior flash receiving pocket for receiving the flash unit when the flash unit is flipped down. An unexposed-film storage slot inside the body portion longitudinally extends at least part way around the flash receiving pocket. An exposed-film chamber inside the body portion is located to receive successive sections of a filmstrip from the unexposed-film storage slot after each film section is exposed. A film take-up spool is rotatable to draw successive sections of the filmstrip from the unexposed-film storage slot to the exposed-film chamber. This particular design is especially useful when the flash unit has a number of flash illumination sources and, therefore, requires a relatively large flash receiving pocket.

5 Claims, 4 Drawing Sheets

5,613,169

COMPACT CAMERA WITH UNEXPOSED-FILM STORAGE SLOT SURROUNDING FLASH RECEIVING POCKET FOR FLIP-UP FLASH UNIT

CROSS-REFERENCE TO RELATED APPLICATION

Reference is made to commonly assigned copending U.S. application Ser. No. 08/584,479, entitled CAMERA WITH FRONT FLIP-UP FLASH UNIT AND REAR FLASH RETAINER HAVING FRONT AND REAR VIEWFINDER OPENINGS, and filed Jan. 11, 1996.

FIELD OF THE INVENTION

The invention relates generally to the field of photography, and in particular to cameras with a flip-up flash unit. More specifically, the invention relates to a compact camera with an unexposed-film storage slot at least partially surrounding a flash receiving pocket for a flip-up flash.

BACKGROUND OF THE INVENTION

It is known for a camera to be provided with a flip-up electronic flash unit and an integrated open-air viewfinder. For example, U.S. Pat No. 4,996,548, issued Feb. 26, 1991, and U.S. Pat. No. 5,005,032, issued Apr. 2, 1991, each disclose a camera comprising a body portion, an electronic flash unit having a front viewfinder opening and supported to be flipped up from the body portion for picture-taking and to be flipped down to the body portion for storage, and a cover part having a rear viewfinder opening and supported to be flipped up from the body portion to align its rear viewfinder opening with the front viewfinder opening of the flash unit when the flash unit is flipped up for picture-taking and to be flipped down partly over the flash unit when the flash unit is flipped down for storage. A torsion spring urges the cover part to follow the flash unit in the same direction when the flash unit is flipped down into a front recess in the body portion.

In this type of camera, relative compactness generally is a problem.

SUMMARY OF THE INVENTION

According to the invention a compact camera comprising a body portion, and a flash unit supported to be flipped up from the body portion for picture-taking and to be flipped down to the body portion for storage, is characterized in that;

the body portion is configured to form an exterior flash receiving pocket for receiving the flash unit when the flash unit is flipped down;

an unexposed-film storage slot inside the body portion longitudinally extends at least part way around the flash receiving pocket;

an exposed-film chamber inside the body portion is located to receive successive sections of a filmstrip from the unexposed-film storage slot after each film section is exposed; and film moving means is actuatable to move successive sections of the filmstrip from the unexposed-film storage slot to the exposed-film chamber.

This particular design is especially useful when the flash unit has a number of flash illumination sources and, therefore, requires a relatively large flash receiving pocket.

DETAILED DESCRIPTION OF THE INVENTION

The invention is disclosed as being embodied preferably in a compact camera with a flip-up flash unit and an integrated open-air viewfinder. Because the features of such a compact camera are generally known, the description which follows is directed in particular only to those elements forming part of or cooperating directly with the disclosed embodiment. It is to be understood, however, that other elements may take various forms known to a person of ordinary skill in the art.

Figure 1:
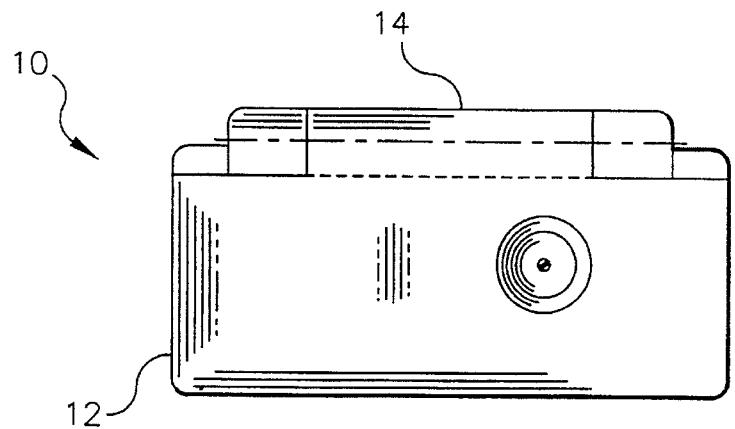
FIG. 1 is a is a front elevation view of the compact camera according to a preferred embodiment of the invention, showing the flash unit flipped down into the flash receiving pocket for storage.
Figure 2:
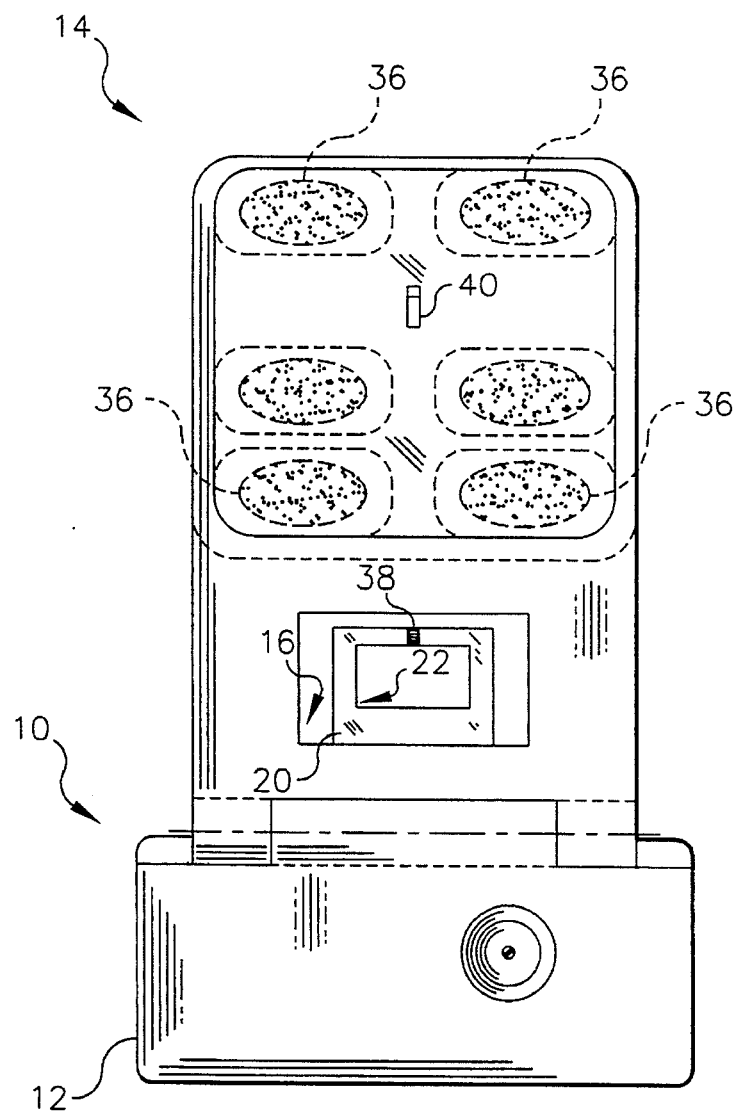
FIG. 2 is a is a front elevation view of the compact camera, showing the flash unit flipped up for picture-taking.
Figure 3:
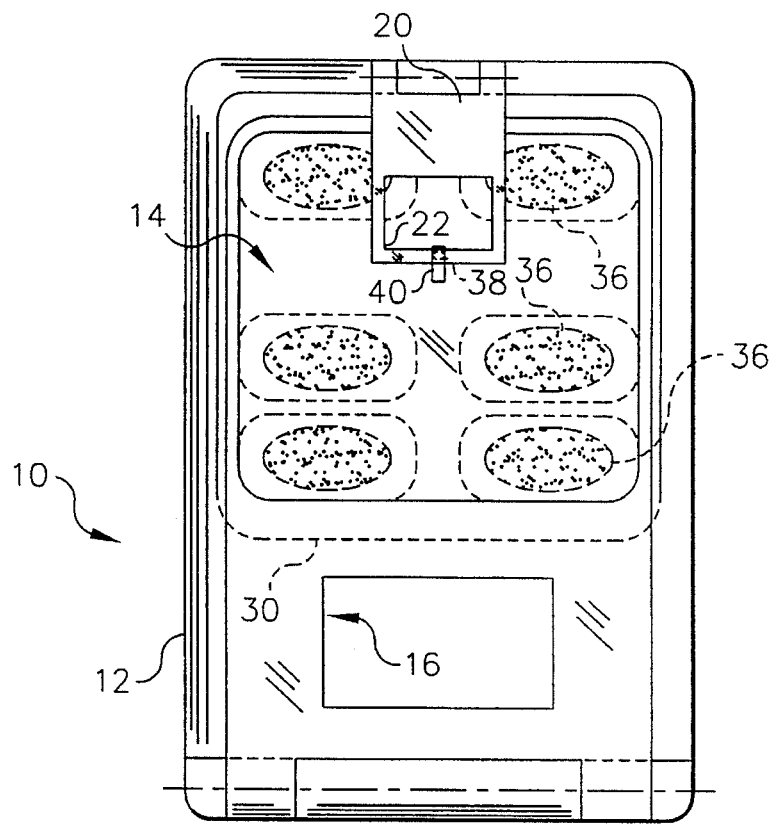
FIG. 3 is a top plan view of the compact camera as shown in FIG. 1.
Figure 4:
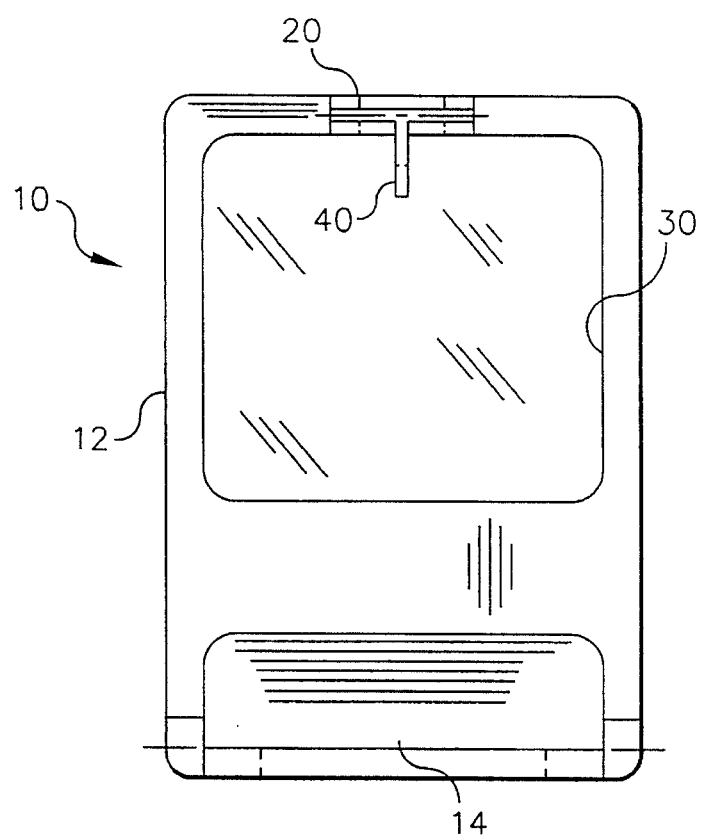
FIG. 4 is a top plan view of the compact camera as shown in FIG. 2.
Figure 5:
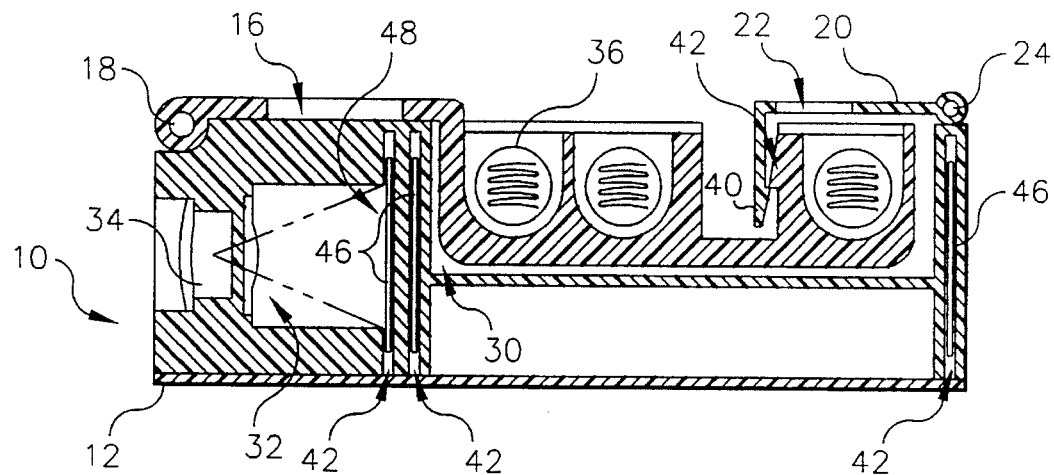
FIG. 5 is a side sectional view of the camera as shown in FIG. 1.
Figure 6:
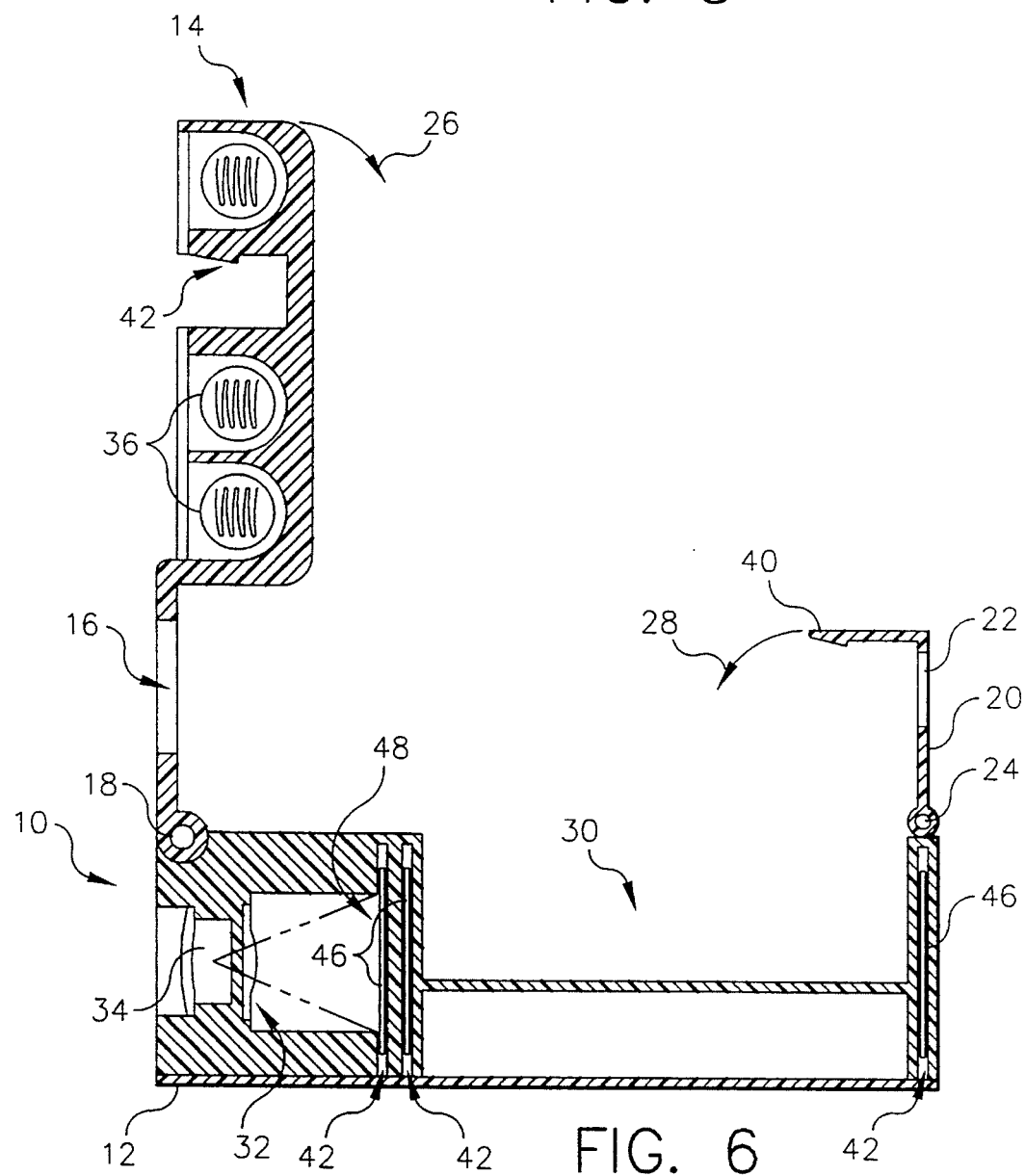
FIG. 6 is a side sectional view of the camera as shown in FIG. 2.

Referring now to the drawings, FIGS. 1–6 show a compact camera 10 comprising a body portion 12, a flash unit 14 having a front viewfinder opening 16 and supported at a front pivot pin 18 to be manually flipped up from the body portion for picture-taking and to be flipped down to the body portion for storage, and a retainer-cover part 20 having a rear viewfinder opening 22 and supported at a rear pivot pin 24 to be manually flipped up from the body portion to align its rear viewfinder opening with the front viewfinder opening of the flash unit when the flash unit is flipped up for picture-taking and to be flipped down partly over the flash unit when the flash unit is flipped down for storage.

The flash unit 14 and the retainer-cover part are adapted to be manually flipped down independently of one another, in rearward and forward opposite directions 26 and 28 with respect to the body portion 12, to permit the flash unit to be flipped down first for storage and the cover part to be flipped down second to partly cover the flash unit. See FIGS. 5 and 6.

The body portion 12 has a top, exterior, rearward pocket or cavity 30 for storing the flash unit 14 when the flash unit is flipped down. See FIGS. 5 and 6. The flash receiving pocket 30 longitudinally extends behind a film exposure chamber 32 which is behind a lens-shutter-shutter unit 34 inside the body portion 12. This particular design is especially useful because the flash unit 14 has a plurality of flash illumination sources in the form of eight built-in flash bulbs 36 and, therefore is relatively large as compared to an electronic flash unit such as shown in prior art U.S. Pat. No. 4,996,548.

The flash unit 14 and the retainer-cover part 20 include mutually engageable means, namely a catch 38 on the flash unit and a flexible hook 40 on the cover part, for releasably engaging when the flash unit and the cover part are each flipped down.

Although not shown, relatively light torsion springs can be provided for holding the flash unit 14 and the cover part 20 flipped up. Alternatively, respective detents can be provided for the same purpose.

Figure 7:
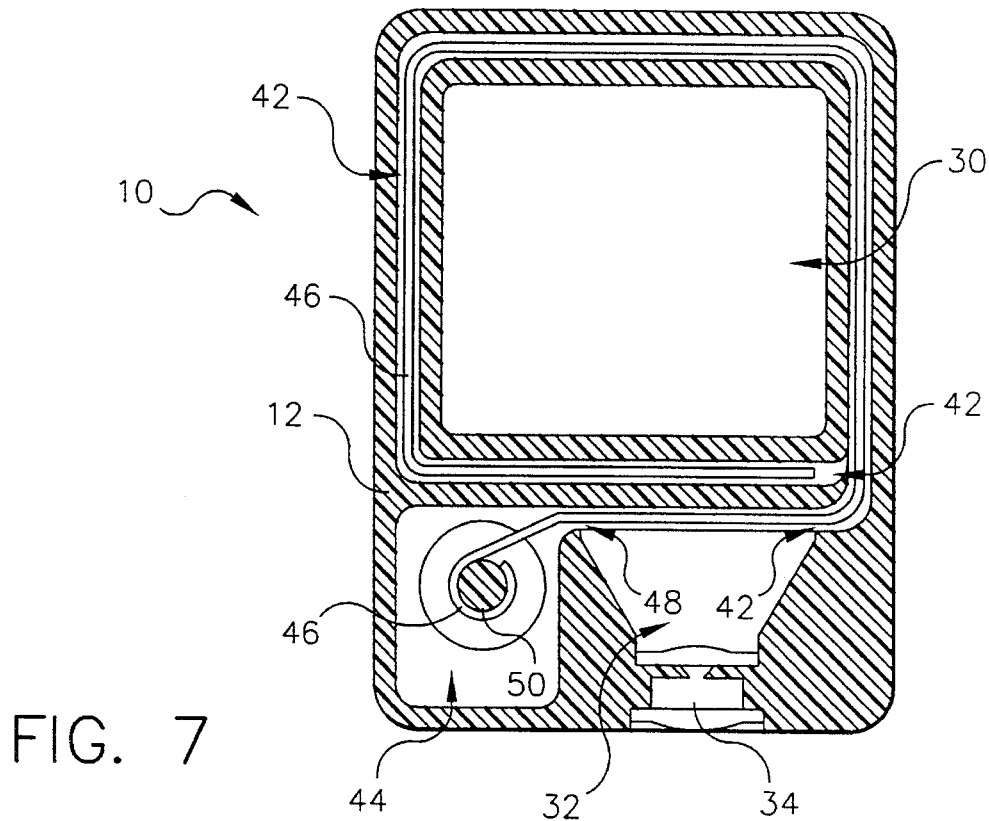
FIGS. 7 and 8 are top sectional views as shown in FIG. 1, depicting a filmstrip in respective unexposed and exposed conditions.
Figure 8:
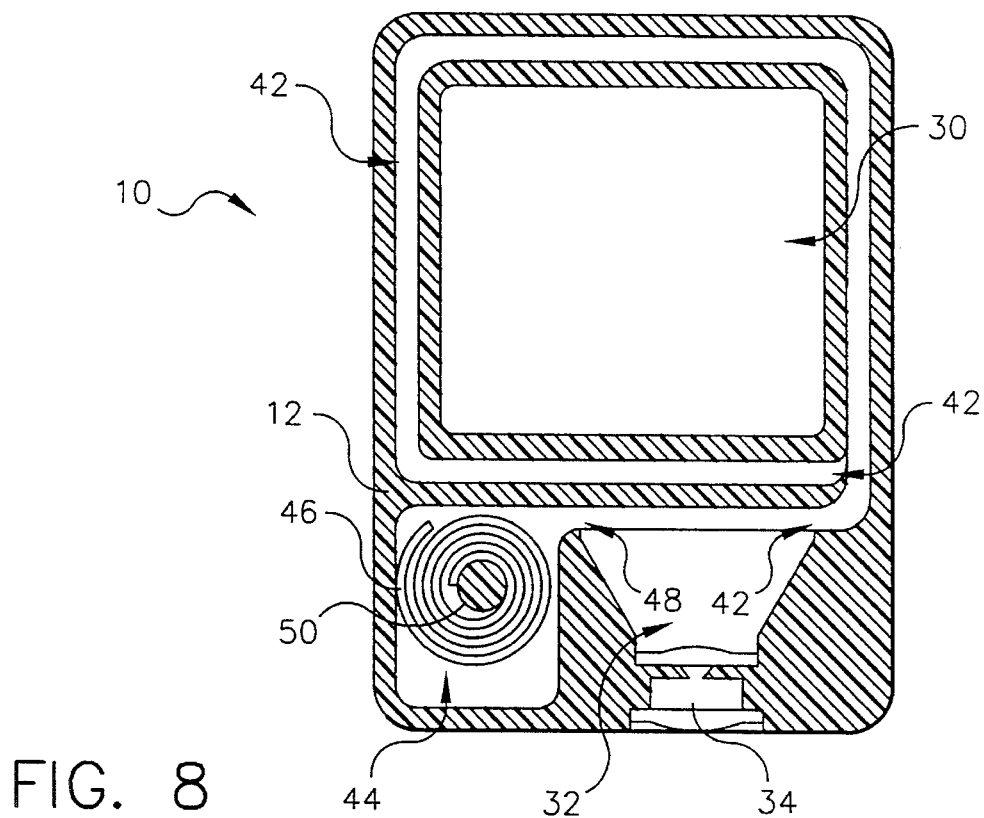

An unexposed-film storage slot 42 inside the body portion 12 longitudinally extends around the exterior flash receiving pocket 30 as shown in FIGS. 5–8. An exposed-film chamber 44 inside the body portion 12 is located alongside the film exposure chamber 32 to receive successive sections of a filmstrip 46 from the unexposed-film storage slot 42 after each film section is exposed at a backframe opening 48 to the film exposure chamber. A manually rotated film take-up spool 50 is rotatably supported within the exposed-film chamber 32 to draw successive sections of the filmstrip 46 from the unexposed-film storage slot 42 to the backframe opening 48 and, thence, to the exposed-film chamber 44.

The invention has been described with reference to a preferred embodiment. However, it will be appreciated that variations and modifications can be effected by a person of ordinary skill in the art without departing from the scope of the invention.

PARTS LIST

- 10. compact camera
- 12. body portion
- 14. flash unit
- 16. front viewfinder opening
- 18. front pivot pin
- 20. retainer-cover part
- 22. rear viewfinder opening
- 24. rear pivot pin
- 26. rearward direction
- 28. forward direction
- 30. flash receiving pocket
- 32. film exposure chamber
- 34. lens-shutter unit
- 36. flash bulbs
- 38. catch
- 40. hook
- 42. unexposed-film storage slot
- 44. exposed-film chamber
- 46. filmstrip
- 48. backframe opening
- 50. film take-up spool

I claim:

1. A compact camera comprising a body portion, and a flash unit supported to be flipped up from said body portion for picture-taking and to be flipped down to the body portion for storage, is characterized in that;

said body portion is configured to form an exterior flash receiving pocket for receiving said flash unit when the flash unit is flipped down;

an unexposed-film storage slot inside said body portion longitudinally extends at least part way around said flash receiving pocket;

an exposed-film chamber inside said body portion is located to receive successive sections of a filmstrip from said unexposed-film storage slot after each film section is exposed; and film moving means is actuatable to move successive sections of the filmstrip from said unexposed-film storage slot to said exposed-film chamber.

2. A compact camera as recited in claim 1, wherein said unexposed-film storage slot is convoluted about said flash receiving chamber.

3. A compact camera as recited in claim 1, wherein a film exposure chamber inside said housing portion is located proximate said flash receiving pocket, and a limited section of said unexposed-film storage slot longitudinally extends between said film exposure chamber and said flash receiving pocket.

4. A compact camera as recited in claim 3, wherein said flash receiving pocket is located behind said film exposure chamber and is open along a top face of said body portion.

5. A compact camera as recited in claim 4, wherein said flash unit has a plurality of flash illumination sources.

* * * * *